United States Patent [19]

Kotani et al.

[11] Patent Number: 5,267,302
[45] Date of Patent: Nov. 30, 1993

[54] FACSIMILE SYSTEM

[75] Inventors: Matahira Kotani, Ikoma; Motohiko Hayashi, Yamato-Koriyama, both of Japan

[73] Assignee: Sharp Kabushiki Kaisha, Osaka, Japan

[21] Appl. No.: 802,634

[22] Filed: Dec. 4, 1991

[30] Foreign Application Priority Data

Dec. 7, 1990 [JP] Japan .................................. 2-400744

[51] Int. Cl.$^5$ ............................................. H04M 11/00
[52] U.S. Cl. ....................................... 379/100; 379/94; 379/97
[58] Field of Search ...................... 379/100, 93, 94, 96, 379/97, 98, 413; 358/402, 403, 407, 437, 434

[56] References Cited

U.S. PATENT DOCUMENTS

| 4,642,697 | 2/1987 | Wada | 379/100 |
| 4,908,851 | 3/1990 | Kotani et al. | 379/100 |
| 4,910,764 | 3/1990 | Bowen | 379/100 |
| 5,046,187 | 9/1991 | Takahashi | 379/97 |
| 5,086,462 | 2/1992 | Oka | 379/413 |

FOREIGN PATENT DOCUMENTS

| 0452864 | 10/1991 | European Pat. Off. . |
| 0458540 | 11/1991 | European Pat. Off. . |
| 62-039950 | 2/1987 | Japan . |
| 2224910 | 5/1990 | United Kingdom . |

OTHER PUBLICATIONS

European Search Report issued Sep. 10, 1992, (EP91120853).

Primary Examiner—Jin F. Ng
Assistant Examiner—Jason Chan
Attorney, Agent, or Firm—David G. Conlin; Robert F. O'Connell

[57] ABSTRACT

A facsimile system includes: a telephone apparatus; a facsimile receiving device for detecting a CNG (Calling Tone) signal, which follows a call request signal from a telephone exchange, on a telephone line, and receiving a facsimile data through the telephone line if the CNG signal is detected; a switching device for selectively connecting the telephone line to either the facsimile receiving device or the telephone apparatus; a device for controlling the switching device such that the switching device connects the telephone line to the telephone apparatus if the CNG signal is not detected by the facsimile receiving device while the telephone line is connected to the facsimile receiving device; and a device for generating a control signal if the CNG signal is not detected by the facsimile receiving device. The facsimile system also includes a pseudo-call requesting device connected to the generating device and the telephone apparatus for outputting a pseudo-call request signal, which is substantially same as the call request signal from the telephone exchange, to the telephone apparatus to make the telephone apparatus ringing when the control signal is inputted from the generating device.

7 Claims, 8 Drawing Sheets

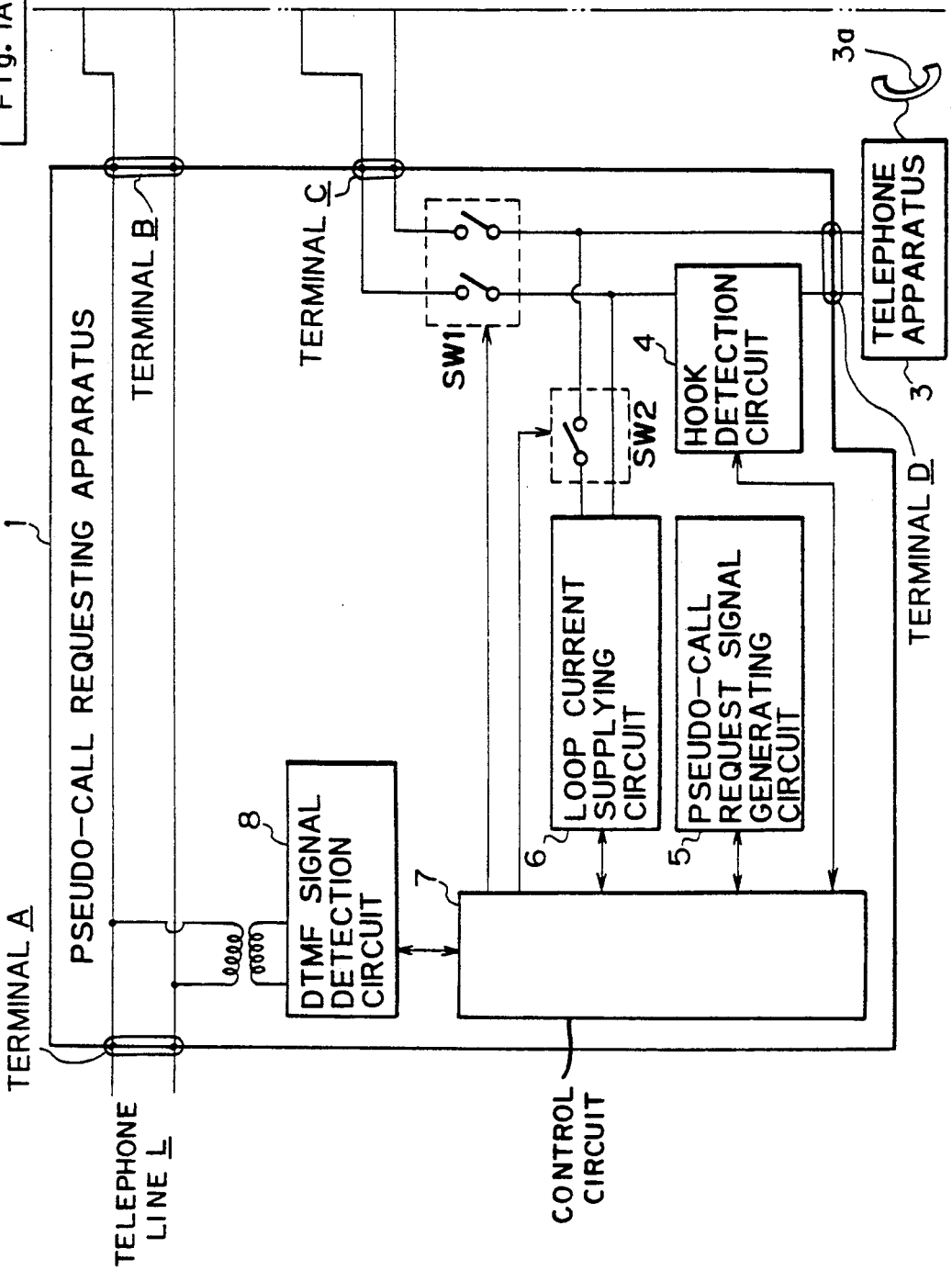

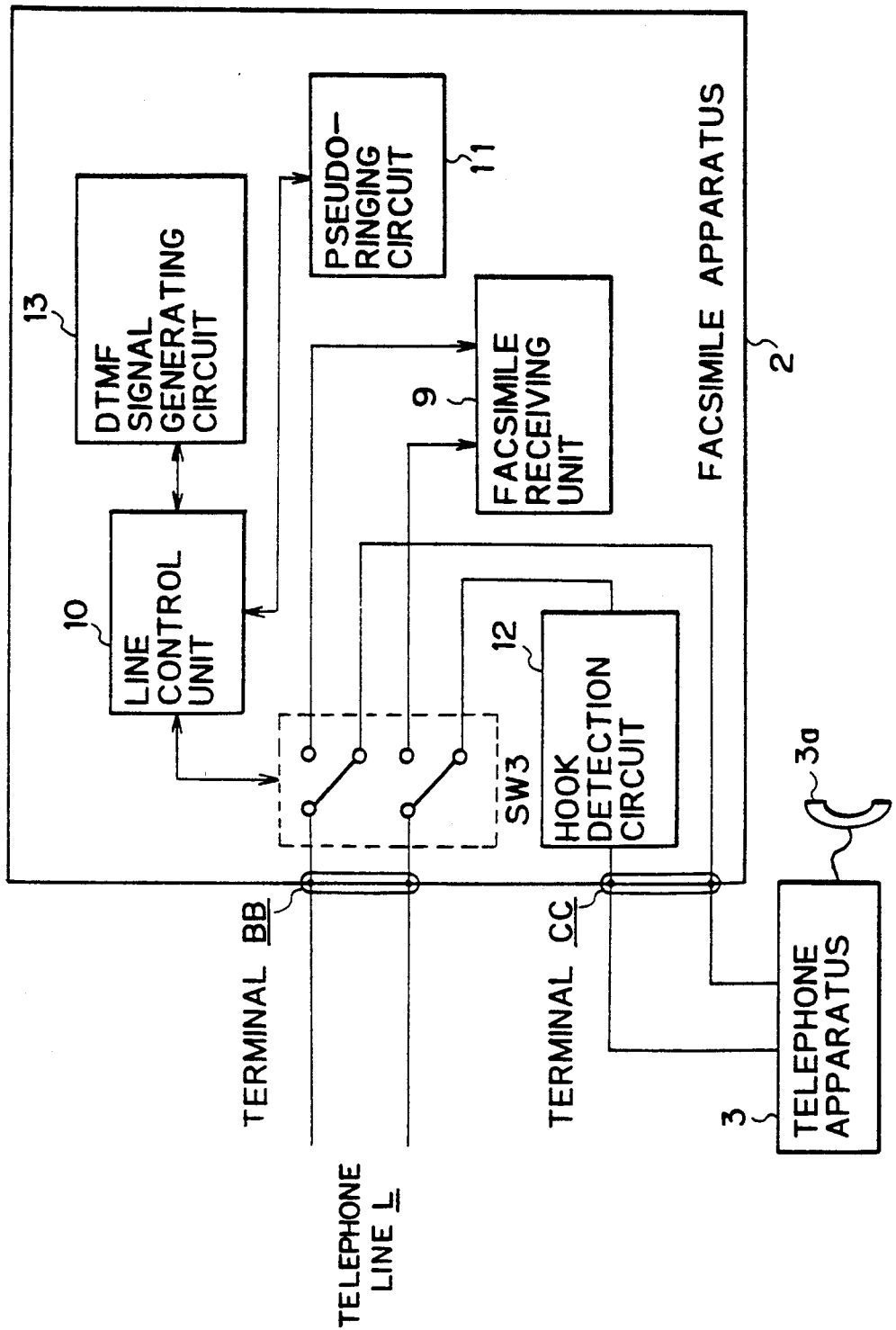

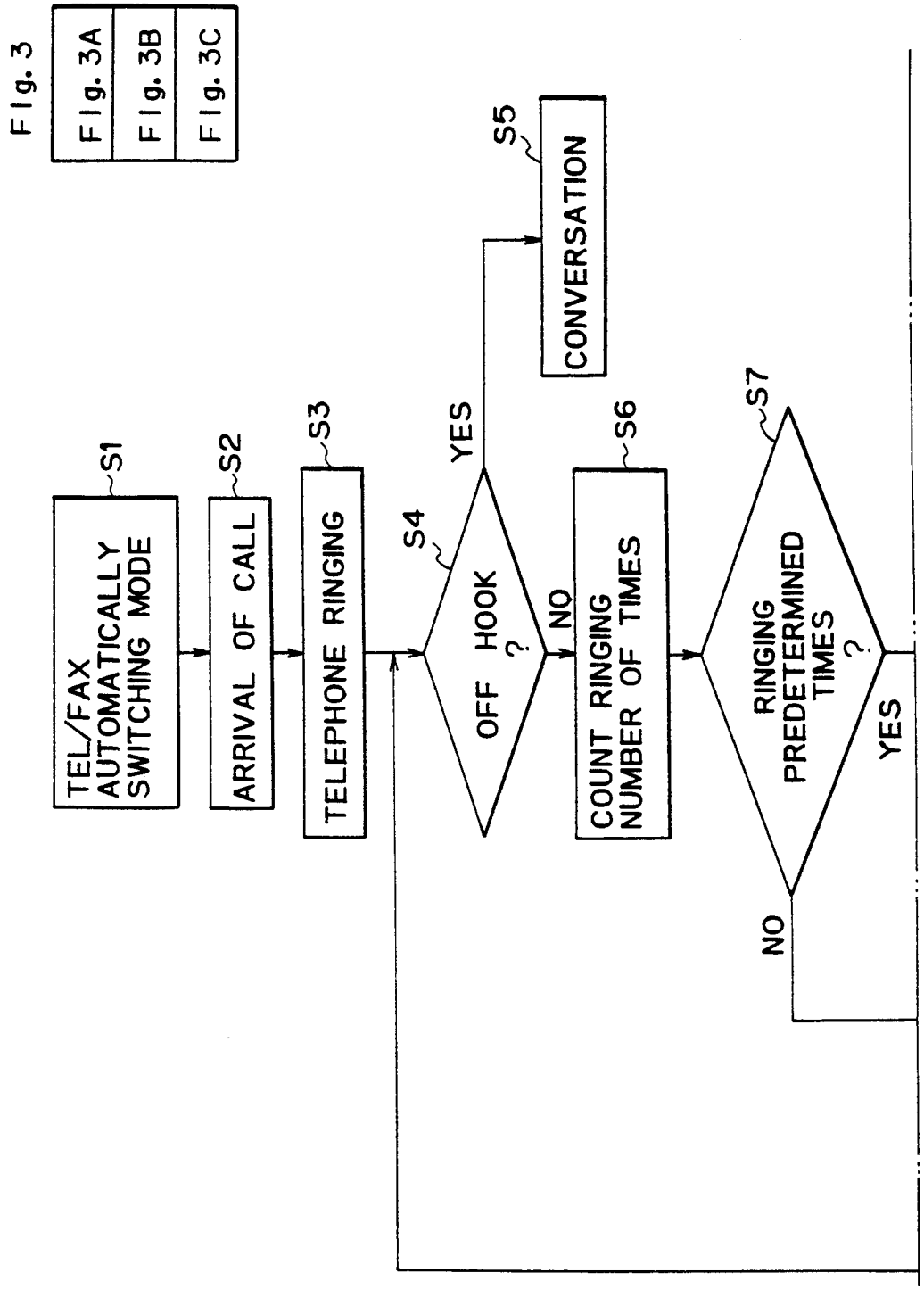

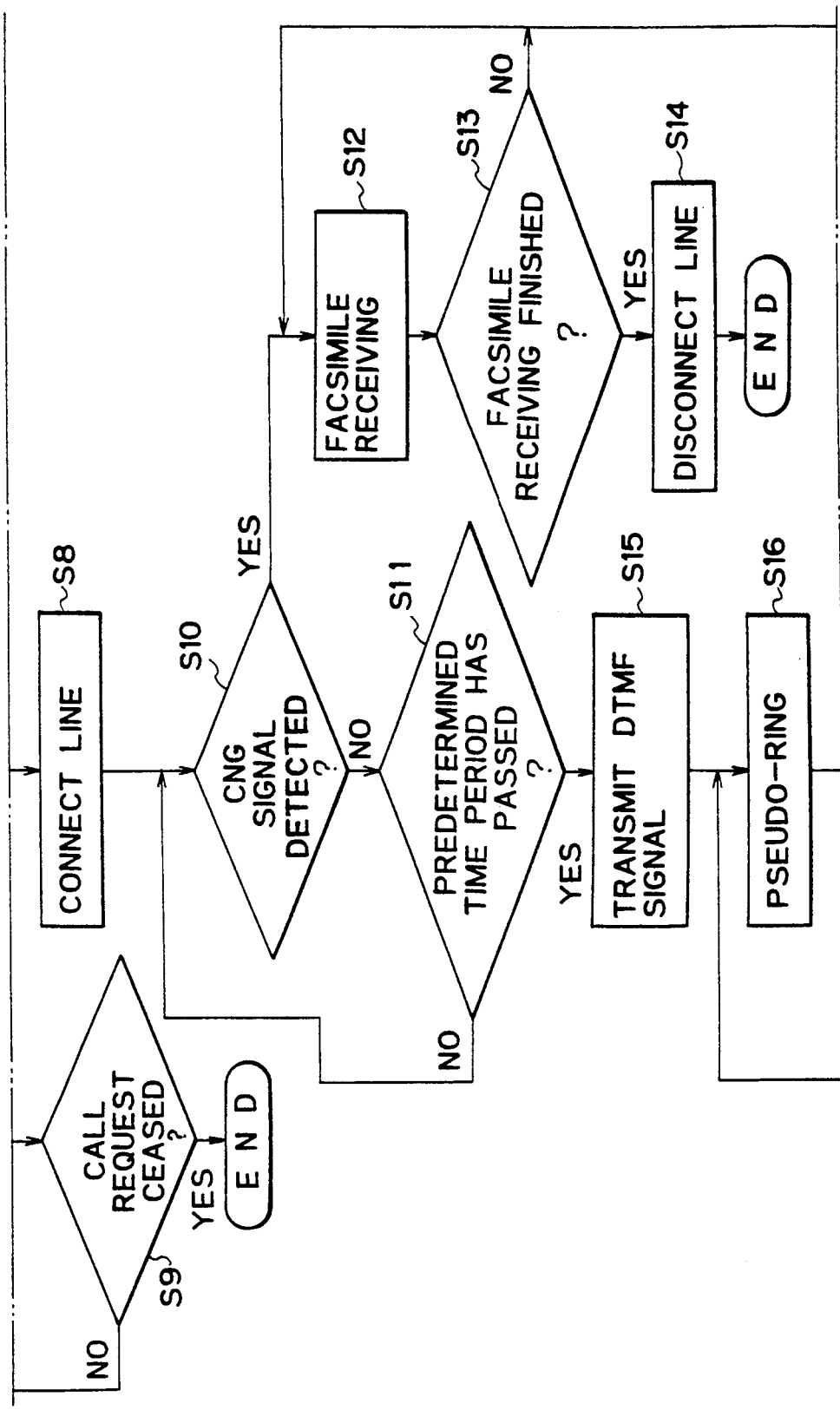

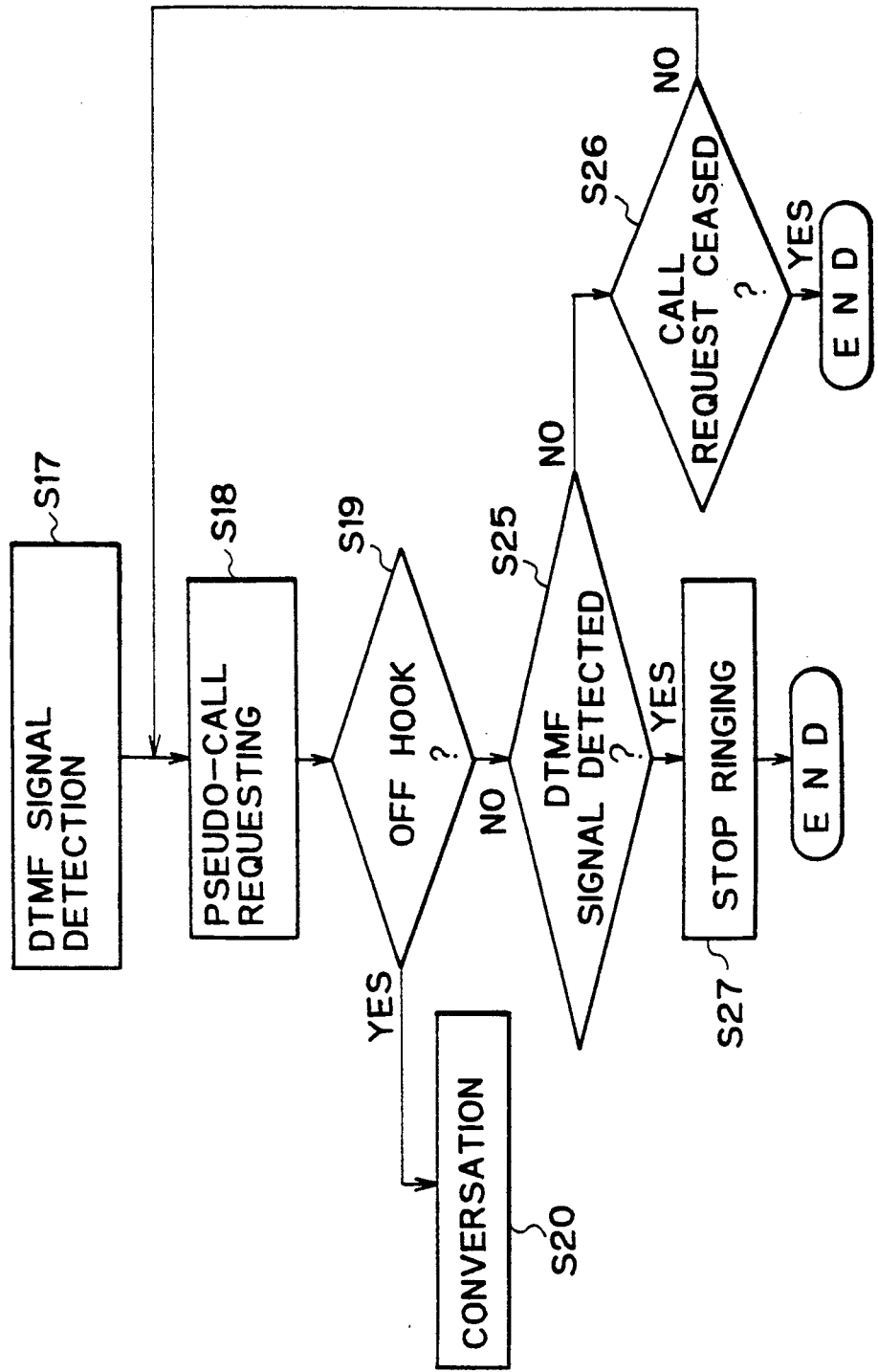

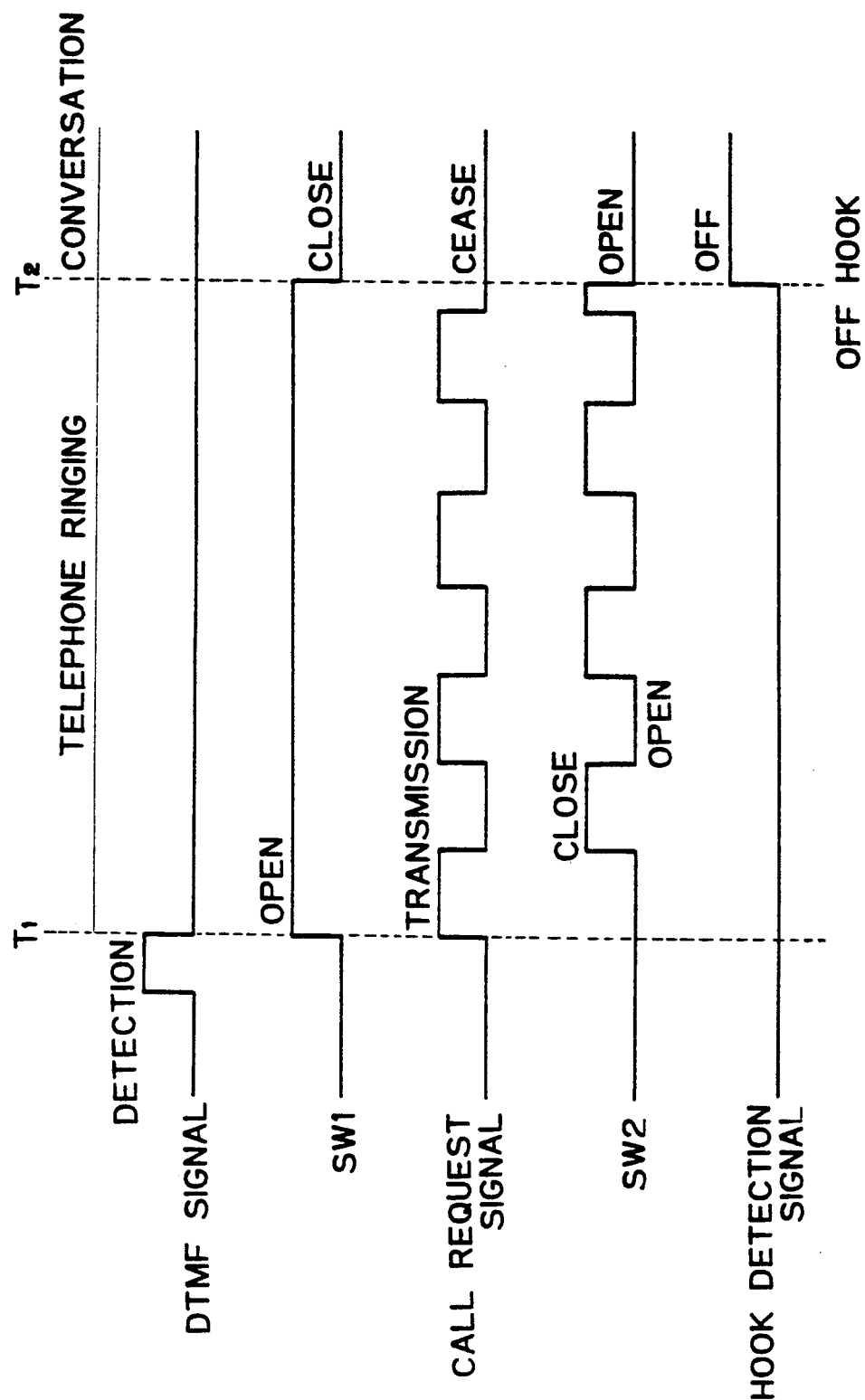

FACSIMILE SYSTEM

BACKGROUND OF THE INVENTION

1. Field of the Invention

The present invention relates to a facsimile system including a facsimile apparatus and a telephone apparatus, in which the telephone apparatus is furnished externally with respect to the facsimile apparatus and shares one telephone line with the facsimile apparatus.

2. Description of the Related Arts

A facsimile apparatus is developed to be reduced in its size and weight nowadays. Especially, as a facsimile apparatus of a low cost and low grade model for the ordinary household use, such a facsimile apparatus as can be externally connected to the conventional telephone apparatus and has only a basic facsimile function, is being well developed.

In this kind of facsimile apparatus for the ordinary household use, the facsimile apparatus shares one telephone line with the telephone apparatus.

Accordingly, in one type of such a facsimile apparatus, when the call is requested to the relevant telephone number, the operator firstly hears and checks the sound outputted from the speaker of the handset of the telephone apparatus by himself, and manually starts either the facsimile receiving operation by use of the facsimile apparatus (facsimile receiving mode) or the conversation by use of the telephone apparatus (conversation mode).

The inventors of the present invention know a developed type of the facsimile apparatus having a TEL/FAX automatically switching function, in which the facsimile apparatus is adapted such that the conversation mode is firstly set when the call arrives, that is to say, the telephone line is firstly automatically connected to the telephone apparatus through the facsimile apparatus so as to ring the telephone apparatus for the predetermined times. Then, the facsimile receiving mode is subsequently set, that is to say, the telephone line is automatically connected to the facsimile apparatus so that it can start the facsimile receiving operation, if the operator does not respond to this ringing sound by picking up the handset (OFF hook) during the conversation mode. Thus, in this case, if the calling station is a telephone apparatus, the operator can not establish the conversation of the telephone apparatus any more, since the telephone line is not connected to the telephone apparatus in this facsimile receiving mode, which is a problem in the practical use of this type of facsimile system.

The inventors of the present invention know another developed type of the facsimile apparatus, which has a reringing function to overcome this problem. Namely, this facsimile apparatus judges whether the calling station is a facsimile apparatus or a telephone apparatus by checking the CNG (Calling Tone) signal, which is supposed to be generated and transmitted from the facsimile apparatus. If it is found that the calling station is a telephone apparatus, the facsimile apparatus generates a pseudo-ringing sound by an exclusive pseudo-ringing device provided in the facsimile apparatus so as to ring up the operator at the site of the facsimile apparatus.

In this facsimile apparatus provided with the pseudo-ringing function, the sound can be generated only at the site of the facsimile apparatus i.e. not at the site of the telephone apparatus. Thus, if the telephone apparatus is located near the facsimile apparatus, the sound generated by the facsimile apparatus can be heard at the site of the telephone apparatus as well by the operator without any problem. However, if the telephone apparatus is located remote from the facsimile apparatus, the pseudo-ringing sound can not be heard by the operator who is in the vicinity of the telephone apparatus, which is the problem in this type of facsimile apparatus. Since the telephone apparatus is often located to such a remote place especially in case of the cordless telephone, which is being well developed nowadays, this problem is quite serious in a practical sense.

On the other hand, in case of a facsimile apparatus of a high cost and high grade model for the business use, the facsimile may be provided with many sophisticated functions such as a telephone line holding function, and a call requesting function to call the telephone apparatus, which is externally furnished with respect to the facsimile apparatus, just in the same manner as the calling station calls the telephone apparatus via the telephone exchange through the telephone line. Namely this facsimile apparatus can make the telephone apparatus ringing even when the call request signal from the telephone exchange through the telephone line is not inputted to the facsimile apparatus. Thus, this facsimile apparatus is adapted to ring the external telephone apparatus whenever it is necessary in the TEL/FAX automatically switching operation i.e. to make a real ringing sound of the telephone apparatus, in place of the above mentioned pseudo-ringing sound generated by the facsimile apparatus.

Accordingly, the operator can hear this real ringing-sound at the site of the telephone apparatus even if it is located remote from the facsimile apparatus, without the above mentioned problem.

However, in case of such a sophisticated facsimile apparatus of a high cost and high grade model for the business use, the body of the facsimile apparatus itself becomes very large, and it is also very expensive for the ordinary household use.

SUMMARY OF THE INVENTION

It is therefore an object of the present invention to provide a facsimile system suitable for the household use, in which the above mentioned problem associated with the ringing operation of the telephone apparatus in the TEL/FAX automatically switching function, can be effectively eliminated at a low cost and in a quite versatile manner, and in which a highly convenient TEL/FAX automatically switching function can be realized.

According to the present invention, the above object can be achieved by a facsimile system including: a telephone apparatus; a facsimile receiving device for detecting a CNG (Calling Tone) signal, which follows a call request signal from a telephone exchange, on a telephone line, and receiving a facsimile data through the telephone line if the CNG signal is detected; a switching device for selectively connecting the telephone line to either the facsimile receiving device or the telephone apparatus; a device for controlling the switching device such that the switching device connects the telephone line to the telephone apparatus if the CNG signal is not detected by the facsimile receiving device while the telephone line is connected to the facsimile receiving device; and a device for generating a control signal if the CNG signal is not detected by the facsimile receiving device. The facsimile system also includes a pseudo-call requesting device connected to the generating device and the telephone apparatus for outputting a pseudo-call request signal, which is substantially same as the call request signal from the telephone exchange, to the telephone apparatus to make the telephone apparatus ringing when the control signal is inputted from the generating device.

According to the present invention, when there is a call to the present facsimile system, the telephone line is connected as the original state, by the switching device under the control of the control device, to the telephone apparatus (conversation mode) for the predetermined number of times of the arrived call request signal, so as to make the telephone apparatus ringing during the corresponding period. Then, if the operator does not respond to the telephone apparatus, the telephone line is connected, by the switching device under the control of the control device, to the facsimile receiving device (facsimile receiving mode). Alternatively, the telephone line may be connected as the original state, by the switching device under the control of the control device, to the facsimile receiving device. In either case, when the telephone line is connected to the facsimile receiving device, the facsimile receiving device responds to the pertinent call request signal from the telephone exchange. Accordingly, the call request signal is ceased, and the communication on the telephone line between the facsimile system and the calling station is established. Then the facsimile receiving device checks if there is a CNG signal on the telephone line.

If the facsimile receiving device detects the CNG signal, the facsimile receiving device judges that the calling station is the facsimile apparatus for requesting the facsimile communication. Thus, the facsimile receiving operation is started by the facsimile receiving device.

On the other hand, if the facsimile receiving device does not detect the CNG signal, the facsimile receiving device judges that the calling station is a telephone apparatus for requesting the conversation (i.e. voice communication). Then, the generating device generates and outputs the control signal, such as a DTMF (Dual Tone Multi-Frequency) signal, to the pseudo-call requesting device. Then, the pseudo-call requesting device generates and outputs the pseudo-call request signal, which is substantially same as the real call request signal from the telephone exchange. Accordingly, though there does not exist the real call request signal on the telephone line at this time, the telephone apparatus can be made ringing by this pseudo-call request signal, in the pertinent TEL/FAX automatic switching operation, just in the same manner as when the real call request signal is inputted to the telephone apparatus.

Thus, even if the telephone apparatus is located remote from the facsimile receiving device, the operator in the vicinity of the telephone apparatus can still hear the real ringing sound of the telephone apparatus in this case and can establish the conversation on the telephone apparatus without any problem.

In the present invention, it is preferred that the facsimile receiving device, the switching device, the control device and the generating device are provided in one unit of a facsimile apparatus. In this case, the pseudo-call requesting device can be equipped between thus constructed facsimile apparatus and the telephone apparatus. Here, the construction of the facsimile system becomes quite advantageous in that a facsimile apparatus quite similar in its specification to that of the rather simple facsimile apparatus in the aforementioned related art for the household use, can be employed as the facsimile apparatus, while the above mentioned very convenient TEL/FAX automatic switching operation can be realized with such a simple facsimile apparatus and a conventional type telephone apparatus, just by equipping the pseudo-call requesting device between them, with a benefit of making the total cost quite low.

Further objects and advantages of the present invention will be apparent from the following description of the preferred embodiment of the invention as illustrated in the accompanying drawings.

BRIEF DESCRIPTION OF THE DRAWINGS

FIG. 1, which is divided into FIG. 1A and FIG. 1B, is a block diagram of a facsimile system as an embodiment of the present invention;

FIG. 2 is a block diagram of the facsimile apparatus and the telephone apparatus, which are directly connected to each other, of the facsimile system of FIG. 1;

FIG. 3, which is divided into FIG. 3A, FIG. 3B and FIG. 3C, is a flowchart showing an operation of the facsimile apparatus of the facsimile system of FIG. 1;

FIG. 4 is a flowchart showing an operation of the pseudo-call requesting apparatus of the facsimile system of FIG. 1; and FIG. 5 is a timing chart of various signals in the pseudo-call requesting apparatus of the facsimile system of FIG. 1.

DETAILED DESCRIPTION OF THE PREFERRED EMBODIMENT

A preferred embodiment of the present invention will be described below with reference to the accompanying drawings.

Figure 1B:
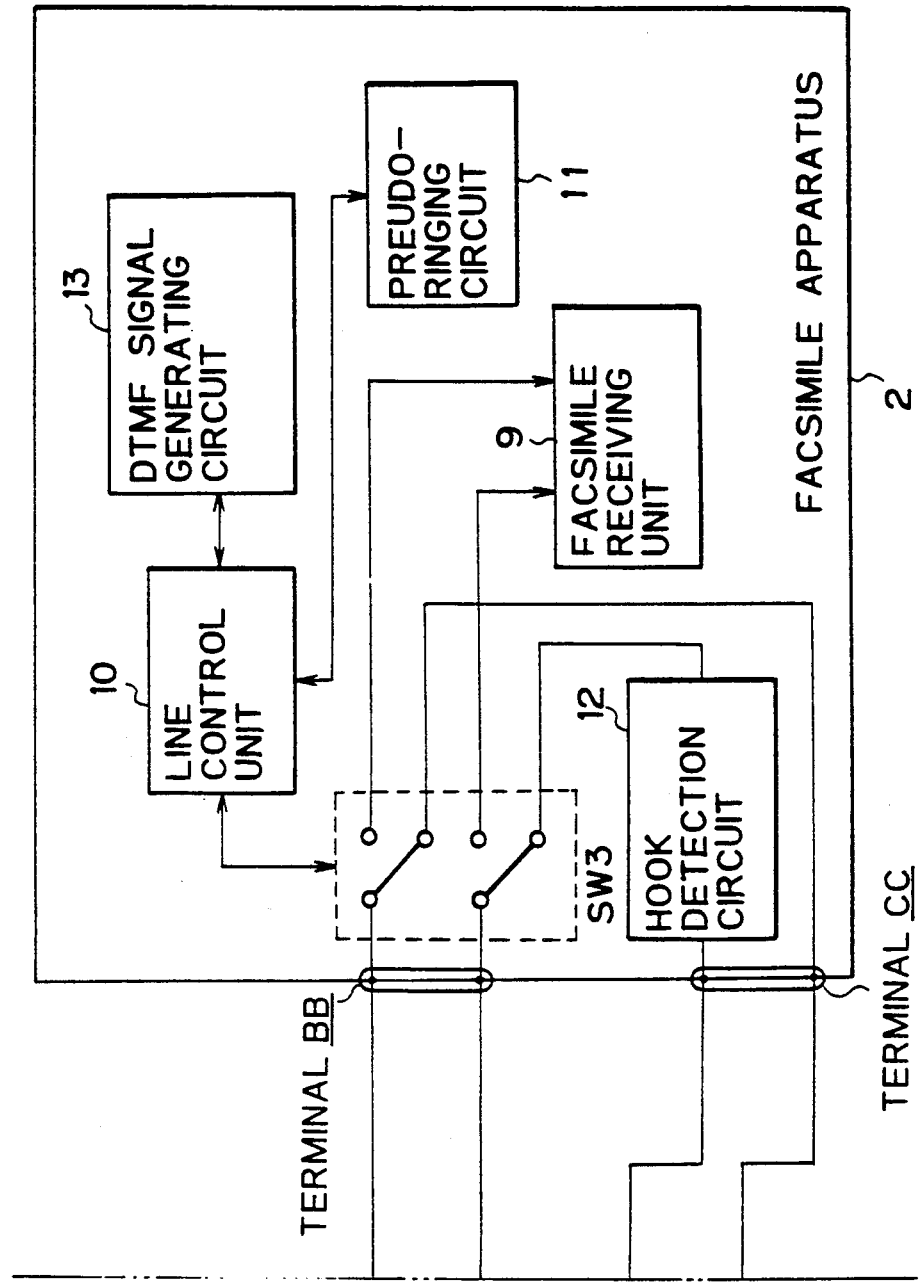

FIG. 1, which is composed of FIG. 1A and FIG. 1B, shows a block diagram of a facsimile system as one embodiment of the present invention.

In FIG. 1, the facsimile system includes a pseudo-call requesting apparatus 1, a facsimile apparatus 2 and a telephone apparatus 3. The pseudo-call requesting apparatus 1 is connected to a telephone line L at its terminal A. The pseudo-call requesting apparatus 1 is also connected to the facsimile apparatus 2 and to the telephone apparatus 3. More particularly, a terminal B of the pseudo-call requesting apparatus 1 is connected to a terminal BB of the facsimile apparatus 2, and a terminal C of the pseudo-call requesting apparatus 1 is connected to a terminal CC of the facsimile apparatus 2, while a terminal D of the pseudo-call requesting apparatus 1, is connected to the telephone apparatus 3.

The telephone apparatus 3 is externally furnished with respect to the facsimile apparatus 2, has a handset 3a, and is adapted to ring when it is dialed i.e. the call request signal, which is normally transmitted from the telephone exchange through the telephone line L in the normal telephone operation, is inputted thereto.

The telephone apparatus 3 shares the telephone line L with the facsimile apparatus 3 under the control of a line control unit 10 of the facsimile apparatus 2.

The facsimile apparatus 2 is provided with a switch SW3, a facsimile receiving unit 9 and the line control circuit 10, such that the switch SW3 is adapted to be switched so as to connect the telephone line L via the terminals A, B and BB, to either the facsimile receiving unit 9 or the telephone apparatus 3 further via the terminals CC, C and D.

The facsimile apparatus 2 has an automatic TEL/-FAX switching function, in which the conversation (i.e. voice communication) mode and the facsimile receiving mode can be automatically switched over to each other. More particularly, when the calling station dials the facsimile apparatus 2, the facsimile apparatus 2 allows the pertinent call request signal from the telephone exchange to pass therethrough to the telephone apparatus 3 via the switch SW3 for a predetermined time period, so as to ring the telephone apparatus 3 for predetermined times, and then the facsimile apparatus 2 switches the switch SW3 to the side of the facsimile receiving unit 9 so as to check if there is the CNG signal on the telephone line L, that is to say, the calling station is a facsimile apparatus or not.

The facsimile apparatus 2 may be provided with a mode selection switch of a operation panel on the main body of the facsimile apparatus 2, to select either the above mentioned TEL/FAX automatically switching mode or a manual switching mode, in which the operator can manually select the facsimile receiving operation or the telephone operation after checking the CNG signal sound by the handset 3a.

The facsimile apparatus 2 is also provided with a pseudo-ringing circuit 11, a hook detection circuit 12 and a DTMF (Dual Tone Multi-Frequency) signal generating circuit 13. The pseudo-ringing circuit 11 generates a pseudo-ringing sound at the site of the facsimile apparatus 2 in order to ring up again the operator after the operation mode is once automatically switched over to the facsimile receiving mode and yet it is found that the voice communication is actually requested by the telephone apparatus of the calling station by checking the CNG signal.

The hook detection circuit 12 is adapted to detect the ON/OFF hook condition of the handset 3a of the telephone apparatus 3 via the terminals D, C and CC. The DTMF signal generating circuit 13 is adapted to generate the DTMF signal to the pseudo-call requesting apparatus 1 via the terminals BB and B, so as to start and stop the operation of the pseudo-call requesting apparatus 1.

The facsimile apparatus 2 is adapted to be operative too in such a configuration that the facsimile apparatus 2 is directly connected to the telephone line L and to the telephone apparatus 3 (without the pseudo-call requesting apparatus 1 therebetween), since the facsimile apparatus 2 can establish either the facsimile communication by itself or the voice communication by use of the telephone apparatus 3 over the telephone line L, as shown in FIG. 2.

As shown in FIG. 2, in order to establish such a configuration, the terminal BB is adapted to be directly connected with the telephone line L while the terminal CC is adapted to be directly connected to the telephone apparatus 3.

However, in such a configuration, the telephone apparatus 3 cannot ring after the operation mode is once automatically switched to the facsimile receiving mode and it is found out that the voice communication is actually requested by the telephone apparatus of the calling station, since the call request signal from the telephone exchange, which would make the telephone apparatus 3 ring, does not exist any more on the telephone line L after the facsimile apparatus 2 responds to this call request signal and checks the CNG signal.

Thus, if this happens, the operator at the site of the telephone apparatus 3, cannot be aware of the fact that the telephone call is being requested if the telephone apparatus 3 is located remote from the facsimile apparatus 2.

Therefore, in the present embodiment, the pseudo-call requesting apparatus 1 is equipped between the facsimile apparatus 2 and the telephone apparatus 3 as shown in FIG. 1, so that the pseudo-call requesting apparatus 1 can make the telephone apparatus 3 ring again when it is required after the facsimile apparatus 2 checks the CNG signal. Namely, the pseudo-call requesting apparatus 1 is adapted to generate and send the pseudo-call request signal, which is substantially same as the real call request signal utilized on the telephone line L in its normal telephone operation. This pseudo-call request signal is generated in correspondence with a specific control signal i.e. the DTMF signal, which is generated by and outputted from the facsimile apparatus 2, as explained hereinbelow in detail.

In FIG. 1, the pseudo-call requesting apparatus 1, is provided with a hook detection circuit 4, a pseudo-call request signal generating circuit 5, a loop current supplying circuit 6, a control circuit 7, a DTMF signal detection circuit 8, a switch SW1, and a switch SW2.

The hook detection circuit 4 is adapted to detect the ON/OFF hook condition of the handset 3a i.e. detect the ON/OFF operation of the hook of the telephone apparatus 3 by the operator. The pseudo-call request signal generating circuit 5 is adapted to call the facsimile apparatus 2 and the telephone apparatus 3 by transmitting a pseudo-call request signal, for example 16 Hz signal which is same as the real call request signal on the telephone line L.

The loop current supplying circuit 6 is adapted to supply the telephone apparatus 3 with a loop current so as to drive the telephone apparatus 3. The switch SW1 is adapted to connect and disconnect the telephone apparatus 3 with the telephone line L via the terminals D, C, CC, BB, B, and A and is closed in its normal status. The switch SW2 is adapted to connect and disconnect the loop current supplying circuit 6 with the telephone apparatus 3 via the terminal D in correspondence with the open or close condition of the switch SW1. The control circuit 7, which is composed of a microprocessor for example, is adapted to control the pseudo-call request signal generating circuit 5, the loop current supplying circuit 6, and the switches SW1 and SW2.

The DTMF signal detection circuit 8 is adapted to detect the DTMF signal which is given from the facsimile apparatus 2 via the terminals BB and B, and the control circuit 7 starts and stops its operation according to the detection of this DTMF signal by the DTMF signal detection circuit 8.

Figure 3C:
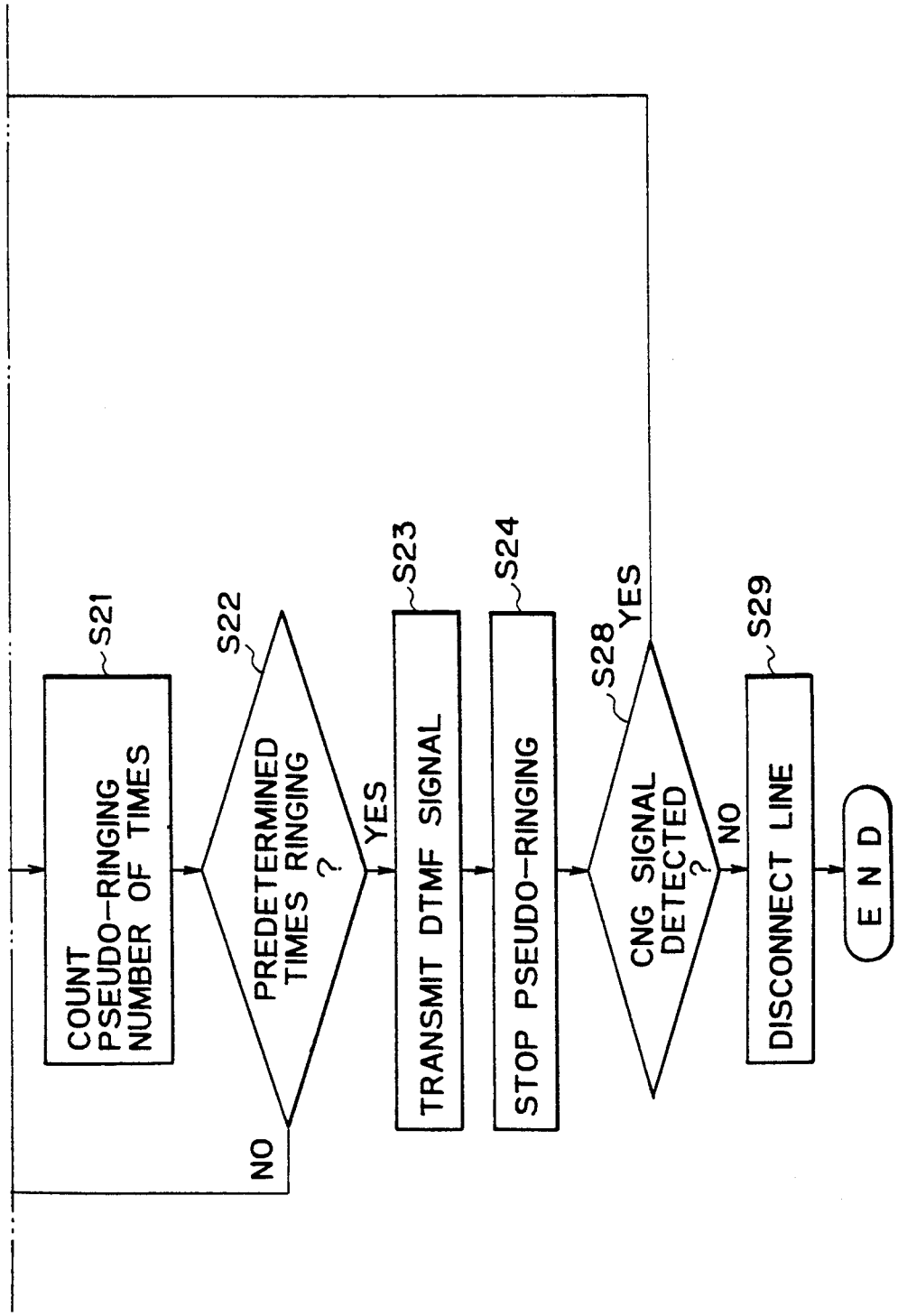

The construction and the operation of the facsimile system of the present embodiment shown in FIG. 1, will be explained hereinbelow with referring to flowcharts of FIG. 3, which is composed of FIG. 3A, FIG. 3B and FIG. 3C and shows the operation flow of the facsimile apparatus 2, and FIG. 4, which shows the operation flow of the pseudo-call requesting apparatus 1 of FIG. 1.

In FIG. 3, the TEL/FAX automatically switching mode, in which the aforementioned automatic TEL/-FAX switching function is enabled, is set in the facsimile apparatus 2 in advance by the operator, by use of the mode selection switch (step S1).

When there is an arrival of a call from the calling station through the telephone line L to the facsimile apparatus 2, in which the switch SW3 is normally switched to connect the telephone line L to the telephone apparatus 3 via the terminals C, CC and D (step S2), the telephone apparatus 3 starts ringing in correspondence with the call request signal, which is transmitted from the telephone exchange (not shown in FIG. 1) of the telephone line L (step S3). At this time, if the OFF-hook operation of the telephone apparatus 3 by the operator is detected by the hook detection circuit 12 at the step S4 (Yes), the flow branches to the step S5 and the conversation i.e. the voice communication through the telephone line L is established between the telephone apparatus 3 and the telephone apparatus of the calling station.

If the OFF hook of the telephone apparatus 3 is not detected by the hook detection circuit 12 at the step S4 (No), this detecting operation is repeated until the predetermined ringing number of times of the telephone apparatus 3 is counted (step S6 and step S7) or until the call request from the telephone exchange is ceased (step S9). If the call request is ceased before ringing for the predetermined times at the step S9 (Yes), the telephone line L is automatically disconnected by the telephone exchange, and the operation of the facsimile system is also ended.

On the other hand, when the Off hook is not detected after ringing for this predetermined times at the step S7 (Yes), the flow branches to the step S8, and the switch SW3 is switched to the side of the facsimile receiving unit 9 according to the control of the line control circuit 10, so that the facsimile receiving unit 9 is connected to the telephone line L via the terminals BB, B and A.

In this condition, the facsimile receiving unit 9 assumes the calling station is a facsimile apparatus, and is set in a condition of waiting for the arrival of the CNG (Calling Tone) signal from the calling station, and the facsimile receiving apparatus 9 keeps detecting the CNG signal (step S10) for the predetermined time period (step S11). If the CNG signal is detected within this predetermined time period at the step S10 (Yes), the flow branches to the step S12 and the prescribed facsimile receiving operation is performed by the facsimile receiving unit 9. Then, this facsimile receiving operation is continued until all of the facsimile data is transmitted (step S13). When the facsimile receiving operation is finished at the step S13 (Yes), the telephone line L is disconnected (step S14).

If the CNG signal is not detected within the predetermined time period at the steps S10 and S11, the flow branches from the step S11 (Yes) to the step S15, and the DTMF signal is generated by the DTMF signal generating circuit 14 and is transmitted to the pseudo-call requesting apparatus 1 via the terminals B and BB. At this time, the pseudo-ringing circuit 11 generates the pseudo-ringing sound (step S16).

The operation of the pseudo-call requesting apparatus 1 on receiving the DTMF signal from the facsimile apparatus 2 (step S15), is explained here with referring to FIG. 4.

In FIG. 4, the inputted DTMF signal is detected by the DTMF signal detection circuit 8 (step S17). Then, corresponding to this detection of the DTMF signal, the control circuit 7 judges that the calling station is not a facsimile apparatus but a telephone apparatus. Thus, the control circuit 7 switches the switch SW1 to its open condition and switches the switch SW2 to its closed condition, so as to call the telephone apparatus 3 i.e. connect both of the pseudo-call request signal generating circuit 5 and the loop current supplying circuit 6 to the telephone apparatus 3 via the terminal D.

When the switch SW1 is switched to its open condition, the control circuit 7 directs the pseudo-call request signal generating circuit 5 to generate the pseudo-call request signal, for example 16 Hz signal, and calls the telephone apparatus 3 (step S18). At the same time, the control circuit 7 operates the switch SW2 alternatively to its open and closed condition corresponding to the generation and cease of the pseudo-call request signal, so as to keep the line loop between the telephone apparatus 3 and the pseudo-call requesting apparatus 1 by supplying the loop current by use of the loop current supplying circuit 6, while the real call request signal from the telephone line L is ceased. In this way, the telephone apparatus 3 is kept ringing by the pseudo-call requesting apparatus 1 in the pertinent condition (step S18).

Then, at the step 19, when the OFF hook of the telephone apparatus 3 by the operator is detected by the hook detection circuit 4 (Yes), the control circuit 7 switches the switch SW1 to its closed condition and switches the switch SW2 to its open condition, so as to connect the telephone apparatus 3 to the telephone line L via the terminals D, C, CC, BB, B and A. Consequently, the conversation i.e. the voice communication between the telephone apparatus 3 and the telephone apparatus of the calling station through the telephone tine L, can be established.

On the other hand, as for the facsimile apparatus 2, if the OFF hook of the telephone apparatus 3 is not detected within the predetermined time period by the hook detection circuit 12 while counting the pseudo-ringing number of times, at the steps S16, S21 and S22 in FIG. 3, the facsimile apparatus 2 transmits the DTMF signal, in order to stop the call requesting operation of the pseudo-call requesting apparatus 1, by the DTMF signal generating circuit 13 (step S23), and stops the pseudo-ringing circuit 11 to ring (step S24).

At this time, as for the pseudo-call requesting apparatus 1, as long as the call request from the calling station is not ceased (step S26), the call requesting operation by use of the pseudo-call request signal generating circuit 5 with respect to the telephone apparatus 3, is continued, until the DTMF signal from the facsimile apparatus 2 is detected by the DTMF signal detection circuit 8 (step S25). If the DTMF signal is detected at the step S25 (Yes), the flow branches to the step S27, and the pseudo-call requesting apparatus 1 stops the call request operation with respect to the telephone apparatus 3. In this way the telephone apparatus 3 stops ringing (S27), and the operation is ended.

Then, as for the facsimile apparatus 2 again, when the pseudo-ringing operation is stopped (step S24), the circuit control unit 10 switches the switch SW3 to connect the telephone line L to the facsimile receiving unit 9 via the terminals A, B and BB.

When the telephone line L is thus connected to the facsimile receiving unit 9, the facsimile receiving unit 9 assumes that the calling station is a facsimile apparatus and is set in a condition of waiting for the CNG signal from the calling station. In this manner, the facsimile receiving apparatus 9 keeps detecting the CNG signal (step S28). If the CNG signal is detected (Yes), the prescribed facsimile receiving operation is performed by the facsimile receiving unit 9 (step S12). Then, when the facsimile receiving operation is finished (step S13), the facsimile apparatus 2 disconnects the telephone line L (step S14).

On the other hand, if the CNG signal is not detected at the step S28 (No), the facsimile apparatus 2 disconnects the telephone line L (step S29) and the operation is ended.

FIG. 5 shows a timing chart of the above described operation of the pseudo-call requesting apparatus 1 from the DTMF signal detection to the OFF hook detection.

In FIG. 5, there are shown the timings of the DTMF signal inputted to the DTMF signal detection circuit 8, the open/close operation signal (SW1) outputted from the control circuit 7 to the switch SW1, the pseudo-call request signal outputted from the pseudo-call request signal generating circuit 5, the open/close operation signal (SW2) outputted from the control circuit 7 to the switch SW2, and the hook detection signal outputted from the hook detection circuit 4.

As shown in FIG. 5, when the DTMF signal is detected by the DTMF signal detection circuit 8 at the time $T_1$, the switch SW1 is switched to its open condition by the control circuit 7, and at the same time, the transmission of the pseudo-call request signal is started by the pseudo-call request signal generating circuit 5. Then, the switch SW2 is started to be alternatively switched to its open and close condition in synchronization with the pseudo-call request signal, and this switching operation of the switch SW2 and this transmitting operation of the pseudo-call request signal are continued until the hook detection circuit 4 detects the OFF hook condition at the time $T_2$ and thus the conversation is enabled. In this manner, during the time interval from the time $T_1$ to the time $T_2$, even though the real call request signal is not given by the telephone exchange through the telephone line L during this time interval, still the telephone apparatus 3 can be kept ringing. Consequently, the operator can be aware that the telephone call is requested to the telephone apparatus 3, even if the telephone apparatus 3 is located remote from the facsimile apparatus 2.

For the connections between the pseudo-call requesting apparatus 1, the facsimile apparatus 2, and the telephone apparatus 3, in the above described embodiment, either of the cord connection or the cord-less connection can be employed.

In the above described embodiment, if the operation mode is set to the manual switching mode, the pseudo-call request to the telephone apparatus 3 by the pseudo-call requesting apparatus 1, is not necessary, since the operator manually responds to this call request from the telephone exchange by use of the handset 3a of the telephone apparatus 3.

The pseudo-call requesting apparatus 1 is effective in case that the telephone apparatus 3 is connected to the facsimile apparatus 2 by the cord-less connection and is located remote from the facsimile apparatus 2, since the telephone apparatus 3 can ring by virtue of the pseudo-call requesting apparatus 1, so that the operator at the vicinity of the telephone apparatus 3, who cannot hear the pseudo-ringing sound generated by the facsimile apparatus 2, can still hear the ringing sound of the telephone apparatus 3 in this case.

As described above in detail, according to the present embodiment, the conventional telephone apparatus 3 and the rather simple facsimile apparatus 2 having a little function i.e. a basic function necessary for the facsimile communication and a simple FAX/TEL automatically switching function (having no function to call the external telephone apparatus), can accomplish a quite convenient FAX/TEL automatically switching function, in cooperation with the pseudo-call requesting apparatus 1 which can be equipped between them in a quite versatile manner. By virtue of thus equipped pseudo-call requesting apparatus 1 between the facsimile apparatus 2 and the telephone apparatus 3, the telephone apparatus 3 can ring again in the TEL/FAX automatically switching receiving operation of the facsimile system, after the conversation mode is switched over the facsimile receiving mode, and then the facsimile apparatus 2 finds out that the calling station is the telephone apparatus. This is because the telephone apparatus 3 can receive the pseudo-call request signal at this time from the pseudo-call requesting apparatus 1 just in the same manner as receiving the real call request signal from the telephone exchange.

Thus, even if the telephone apparatus 3 is located remote from the facsimile apparatus 2, the operator in the vicinity of the telephone apparatus 3 can still hear the ringing sound of the telephone apparatus 3 in this case and can establish the conversation on the telephone apparatus 3 without any problem.

Further, the construction of the present embodiment is also quite advantageous in that a facsimile apparatus quite similar in its specification to that of the aforementioned related art facsimile apparatus for the household use, can be employed as the facsimile apparatus 2, while the above mentioned very convenient TEL/FAX automatic switching operation can be realized with such a facsimile apparatus and a conventional type telephone apparatus, just by equipping the pseudo-call requesting apparatus 1 between them, with a benefit of making the total cost quite low.

Many widely different embodiments of the present invention may be constricted without departing from the spirit and scope of the present invention. It should be understood that the present invention is not limited to the specific embodiments described in this specification, except as defined in the appended claims. R

What is claimed is:

1. A facsimile system having a TEL/FAX switching function, comprising:
    a telephone apparatus;
    a facsimile apparatus having a first terminal and a second terminal, said facsimile apparatus including
    a facsimile receiving means for detecting a CNG signal, which follows a call request signal from a telephone exchange, on said first terminal, and receiving facsimile data through said first terminal if said CNG signal is detected;
    a switching means for selectively connecting said first terminal to either said facsimile receiving means or said second terminal,
    means for controlling said switching means so as to connect said first terminal to said facsimile receiving means on ringing said telephone apparatus a predetermined number of times, and so as to connect said first terminal to said second terminal unless said CNG signal is detected by said facsimile receiving means within a predetermined period after connecting said first terminal to said facsimile receiving means, and
    means for generating a Dual Tone Multi Frequency (DTMF) signal and supplying said generated DTMF signal to said first terminal unless said CNG signal is detected by said facsimile receiving means within said predetermined period; and a pseudo-call requesting apparatus to be connected to a telephone line, to said facsimile apparatus, and to said telephone apparatus, for outputting a pseudo-call request signal, which is substantially the same as said call request signal from said telephone exchange, to said telephone apparatus to make said telephone apparatus ring when said DTMF signal is inputted from said facsimile apparatus, said pseudo-call requesting apparatus having a first terminal connected to said first terminal of said facsimile apparatus in order to connect said telephone line to said facsimile apparatus and receive said DTMF signal from said facsimile apparatus and a second terminal connected to said second terminal of said facsimile apparatus in order to connect said telephone line to said telephone apparatus via said facsimile apparatus, said telephone apparatus and said pseudo-call requesting apparatus being allowed to be placed at a distance from said facsimile apparatus.

2. A facsimile system according to claim 1, wherein said pseudo-call requesting apparatus comprises a pseudo-call request signal generating means and a loop current supplying means for making said telephone apparatus ring.

3. A facsimile system according to claim 1, further comprising means for detecting an ON/OFF hook condition of said telephone apparatus.

4. A facsimile system according to claim 3, wherein said control means is adapted to count the number of said call request signal, and control said switching means to connect said telephone line to said telephone apparatus while counting said number of said call request signal until a predetermined number, and then to connect said telephone line to said facsimile receiving means so as to detect said CNG signal if the OFF hook condition is not detected by said detecting means during said predetermined number of said call request signal.

5. A facsimile system according to claim 1, wherein said pseudo-call requesting apparatus comprises means for detecting an ON/OFF hook condition of said telephone apparatus, and is adapted to stop outputting said pseudo-call request signal when an OFF hook condition is detected by said detecting means.

6. A facsimile system according to claim 1, wherein said facsimile apparatus comprises a pseudo-ringing means for making a pseudo ringing sound if said CNG signal is not detected by said facsimile receiving means while said telephone line is connected to said facsimile receiving means by said switching means.

7. A facsimile system according to claim 1, wherein said generating means comprises a DTMF signal generating circuit, and said pseudo-call requesting apparatus includes a DTMF signal detection circuit.

* * * * *